ably lugs 17, 17, stamped
UNITED STATES PATENT OFFICE.

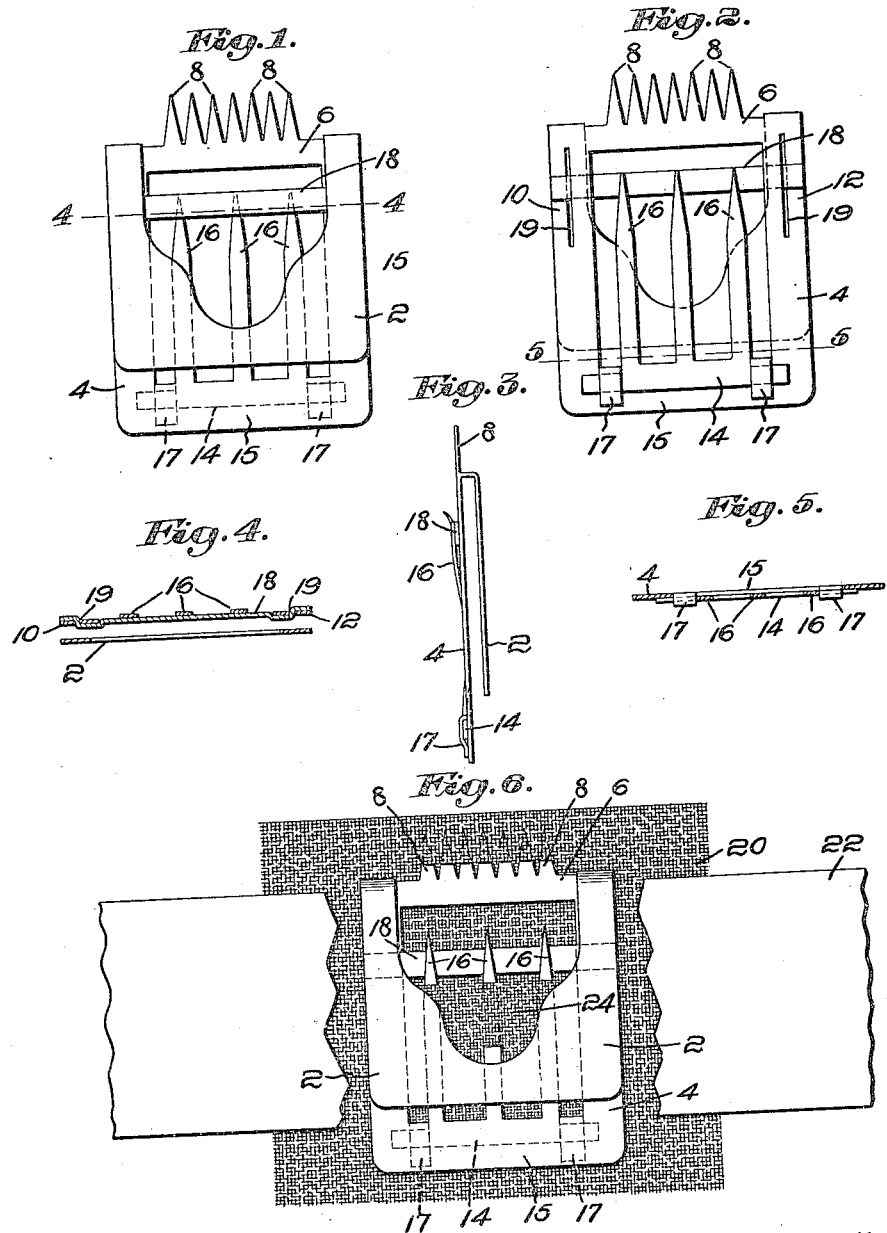

ANDREAS SCHRAMA, OF HAMBURG, GERMANY.

BELT OR GARMENT SUPPORTER OR HOLDER.

1,223,739. Specification of Letters Patent. Patented Apr. 24, 1917.

Application filed March 14, 1916. Serial No. 84,010.

*To all whom it may concern:*

Be it known that I, ANDREAS SCHRAMA, a subject of the German Emperor, and a resident of the city of Hamburg, Federal State of the German Empire, have invented an Improvement in Belts or Garment Supporters or Holders, of which the following description, in connection with the accompanying drawings, is a specification, like characters on the drawings representing like parts.

This invention relates to a device enabling a garment to be supported or held in place by a belt or band.

The objects and features of the invention will best be understood from the following description taken in connection with the accompanying drawings of one embodiment of the invention, selected for the purpose of illustration, it being understood that the invention in its true scope is definitely set forth in the claims.

In the drawings:

Figure 1 is a front view of one illustrative embodiment of the invention;

Fig. 2 is a back view of the embodiment shown in Fig. 1;

Fig. 3 is a side view of the embodiment of the invention shown in Fig. 1;

Fig. 4 is a horizontal cross-section on line 4—4 of Fig. 1;

Fig. 5 is a horizontal cross-section on line 5—5 of Fig. 2; and

Fig. 6 illustrates one mode or manner of using the invention, that portion of the belt between the front and back members 2 and 4 being broken away to show the position of the teeth 16 and coöperating parts.

The embodiment of the invention shown and described for illustrative purposes comprises a body portion including a front piece 2 and back piece 4, said front and back pieces being preferably integral and joined at their points of junction by a transverse piece 6, also preferably integral with said front and back pieces. This transverse piece 6 is provided with outwardly directed teeth 8. Herein seven such teeth are provided, but it will be apparent that a greater or less number may be used as required.

Between the side members 10 and 12 of the back piece 4, there extends a cross pin or bar 14 provided with teeth 16, directed away from the lower end of said back piece and substantially parallel to the two side members 10 and 12 of the latter. The cross bar 14 will preferably be pivoted at either end to the cross piece 15, joining the lower ends of the side members 10 and 12 of said back piece, as shown in Figs. 1, 2 and 3, so as to permit a certain amount of swinging movement of the teeth 16 about the axis of said cross bar 14. Any suitable pivotal connection for the cross bar 14 may be provided, but preferably lugs 17, 17, stamped integral with the cross piece 15 and bent over to form bearings engaged by the rounded ends of the cross bar 14, are used. Herein three teeth 16 are provided, but it will be apparent that fewer teeth or a greater number could be used, according to the size of the device or the requirements for the use to which it is to be put. Preferably the teeth 8 and 16 will be quite fine, so as to make as small a perforation as possible in the cloth. Preferably locking means for locking or securing the teeth 16 in their operative position, as hereinafter described, will be provided, said locking means herein consisting of a transverse bar 18, adapted to move longitudinally of said side members 10 and 12 of said back piece 4. Such movement may be provided for in any suitable manner. As a means for providing for such movement, the ends of said cross bar herein engage longitudinal slots 19, 19, provided in the side members 10 and 12. Owing to the relative thinness of the members 10 and 12, said slots will preferably be made transversely to the plane of said side members, and the end portions of the locking bar 18 bent to engage said slots and prevent longitudinal slippage of said bar. In this way the characteristic flatness of the device will be maintained. The ends of the bar 18 will preferably engage the slots 19, 19 of said side members 10 and 12 with a close sliding fit.

Referring more particularly to Fig. 6, the mode of use and operation of the device embodying the present invention when used in conjunction with a belt to support a garment will now be described.

In this figure the waist band of the garment (trousers, skirt, etc.,) is shown at 20 and the belt at 22. When used for this purpose, the back piece 4 is placed against the waist band at the point desired, with the teeth 8 and 16 pointing toward the upper edge of said band, and the teeth 8 are then caused to penetrate the material of the waist band and the points of the teeth 16 also to enter said material and then reissue therefrom, said teeth 16 thus passing through a fold 24 of said material, substantially as shown in said figure. During this operation, the transverse locking bar 18 has been kept above the points of the teeth 16, but said bar is now slid down along the side members 10 and 12 of the back piece, so as to introduce said bar 18 between the material and the end portions of the teeth 16. The transverse bar 18 thus has the effect of locking the teeth 16 in operative position and is itself held in locking position by its frictional engagement with the side members 10 and 12 of the back piece 4 and by the pressure exerted on said bar 18 by the teeth 16. The latter will preferably have their pointed end portions slightly curved or bent away from the front piece 2, see Fig. 3. The belt 22 is introduced between the front piece 2 and back piece 4, said front piece 2 being thus the only part of the device that is visible.

The device can be used for other purposes. For example, it can be used to hold down a waist in conjunction with a belt or tape, the device being in this case applied to the waist band or other suitable portion of the waist in the same manner as above explained with reference to Fig. 6, but with the points of the teeth 8 and 16 directed downwardly, and the belt or tape being received, of course, between the front piece 2 and back piece 4.

The device embodying this invention may be made of any suitable material, but preferably of some suitable metal. The whole device, with the exception of the cross pin 14 with its teeth 16 and the transverse locking bar 18, can be stamped out in a single operation from a piece of sheet metal or other sheet material. These two pieces can also be stamped from sheet material and readily secured in place.

It will be apparent that a device embodying the present invention possesses many advantages over similar devices as heretofore constructed. It can be manufactured at low cost, it is simple in construction, very easily applied and efficient in operation. It will be noted that when in place it takes up very little space in the direction of thickness, as all the parts are located substantially in the same plane, with the exception of the front piece 2, and this is only separated from the rear piece 4 by the distance required to receive the belt or band. This eliminates the bulky appearance found in other devices of this nature. The arrangement of the teeth is such that the device lies very flat, when in place, and is firmly held in position, particularly when locked by the locking bar 18. Other advantages will be apparent to those skilled in the art.

It will be understood that while the invention is herein described as embodied in the details illustrated, the invention is not to be considered as circumscribed by or limited to these details, or any of them, but that the said details may be variously modified within the true scope of the invention which is definitely set forth by the claims.

Claims:

1. A device to enable a garment to be supported or held in place by a belt or band, comprising, in combination, a belt embracing member; teeth projecting outwardly from one marginal portion of said member; teeth pivotally connected to said member adjacent the opposite marginal portion thereof and projecting inwardly therefrom; and a locking member, mounted for sliding movement relatively to said belt embracing member for locking said last named teeth in operative position.

2. A device to enable a garment to be supported or held in place by a belt or band, comprising, in combination, a belt receiving body portion; a toothed member carried by said body portion for securing said device to the garment by passing said toothed member through a part of the material to which the device is to be secured with the free end of said toothed member projecting from said material; and means movably mounted on said body portion to enable said means to be inserted between the material and the end portion of said toothed member, that projects from said material, and prevent disengagement of said toothed member.

3. A device to enable a garment to be supported or held in place by a belt or band, comprising, in combination, a relatively flat belt embracing member; and means to secure said device to a garment, including toothed means projecting from one marginal portion of said belt embracing member inwardly toward the opposite marginal portion of said member, and further toothed means projecting outwardly from said opposite marginal portion, both of said toothed means being located in substantially the same plane when the device is secured to the garment.

4. A device to enable a garment to be supported or held in place by a belt or band, comprising, in combination, a belt embracing member 2, 4; toothed means 16 pivotally secured to and projecting inwardly from one marginal portion of said belt embracing member toward the opposite marginal portion of said member for securing said device to the garment; a locking member 18 slidingly connected to said belt embracing member for locking said toothed means in operative position, said belt embracing member being recessed to render said toothed means and said locking means readily accessible for manipulation.

In testimony whereof, I have signed my name to this specification, in the presence of two subscribing witnesses.

ANDREAS SCHRAMA.

Witnesses:
BERTHE DAVID,
SIGRID GUBITZ.